US011265937B2

United States Patent
Yu et al.

(10) Patent No.: US 11,265,937 B2
(45) Date of Patent: Mar. 1, 2022

(54) DEVICE DISCOVERY IN A DEVICE TO DEVICE COMMUNICATION USING TWO TYPES OF DISCOVERY

(71) Applicant: Nokia Solutions and Networks Oy, Espoo (FI)

(72) Inventors: Ling Yu, Kauniainen (FI); Vinh Van Phan, Oulu (FI); Juha Korhonen, Espoo (FI)

(73) Assignee: Nokia Solutions and Networks Oy, Espoo (FI)

( * ) Notice: Subject to any disclaimer, the term of this patent is extended or adjusted under 35 U.S.C. 154(b) by 867 days.

(21) Appl. No.: 15/513,073

(22) PCT Filed: Sep. 24, 2014

(86) PCT No.: PCT/EP2014/070297
§ 371 (c)(1),
(2) Date: Mar. 21, 2017

(87) PCT Pub. No.: WO2016/045713
PCT Pub. Date: Mar. 31, 2016

(65) Prior Publication Data
US 2017/0295602 A1     Oct. 12, 2017

(51) Int. Cl.
*H04W 76/14*     (2018.01)
*H04W 8/00*     (2009.01)
(Continued)

(52) U.S. Cl.
CPC ........... *H04W 76/14* (2018.02); *H04W 8/005* (2013.01); *H04W 48/16* (2013.01);
(Continued)

(58) Field of Classification Search
CPC ..... H04W 48/16; H04W 72/04; H04W 8/005; H04W 76/14; H04W 72/0406; H04W 92/18; H04W 48/08; H04W 76/02
See application file for complete search history.

(56) References Cited

U.S. PATENT DOCUMENTS

| | | | |
|---|---|---|---|
| 2013/0288668 A1* | 10/2013 | Pragada | H04W 8/005 455/426.1 |
| 2014/0056220 A1* | 2/2014 | Poitau | H04W 76/14 370/328 |

(Continued)

FOREIGN PATENT DOCUMENTS

| | | |
|---|---|---|
| WO | 2014032892 A1 | 3/2014 |
| WO | 2014033351 A1 | 3/2014 |

OTHER PUBLICATIONS

ZTE: "Data flow for D2D intra-cell and inter-cell discovery", 3GPP Draft; R2-141673—Data Flow for D2D Intra-Cell and Inter-Cell Discovery, 3rd Generation Partnership Project (3GPP), Mobile Competence Centre ; 650, Route Des Lucioles ; F-06921 Sophia-Antip (Year: 2014).*

(Continued)

*Primary Examiner* — Kyaw Z Soe
(74) *Attorney, Agent, or Firm* — Harrington & Smith (57) ABSTRACT

Method and apparatus for device discovery are disclosed. In the method a type of device discovery to be used by a device for proximity services involving at least one another device is determined, wherein the available types of discovery comprise at least a first type discovery where additional resource information is provided for the device and a second type discovery where no additional resource information is provided. The method further comprises signalling Information based on the determined type of device discovery.

20 Claims, 3 Drawing Sheets

(51) Int. Cl.
　　　H04W 48/16　　(2009.01)
　　　H04W 72/04　　(2009.01)
　　　H04W 48/08　　(2009.01)
　　　H04W 92/18　　(2009.01)

(52) U.S. Cl.
　　　CPC ........ *H04W 72/0406* (2013.01); *H04W 48/08* (2013.01); *H04W 92/18* (2013.01)

(56)　　　　References Cited

U.S. PATENT DOCUMENTS

2015/0201317 A1* 7/2015 Kuusilinna ........... H04W 76/14
　　　　　　　　　　　　　　　　　　　　　　　370/254
2015/0305070 A1* 10/2015 Ahmad ............. H04W 12/0431
　　　　　　　　　　　　　　　　　　　　　　　370/338

OTHER PUBLICATIONS

ZTE: "Data flow for D2D intra-cell and inter-cell discovery", 3GPP Draft; R2-141673—Data Flow for D2D Intra-Cell and Inter-Cell Discovery, 3rd Generation Partnership Project (3GPP), Mobile Competence Centre ; 650, Route Des Lucioles ; F-06921 Sophia-Antip (Year: 2014) (Year: 2014).*

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description;Stage 2 (Release 12)", 3GPP TS 36.300, V12.1.0, Mar. 2014, pp. 1-209.

"Random Sampling And Random Assignment Made Easy!", Research Randomizer, Retrieved on Apr. 20, 2017, Webpage available at : https://www.randomizer.org/form.htm.

"3rd Generation Partnership Project; Technical Specification Group Services and System Aspects; Feasibility study for Proximity Services (ProSe) (Release 12)", 3GPP TR 22.803, V12.2.0, Jun. 2013, pp. 1-45.

International Search Report and Written Opinion received for corresponding Patent Cooperation Treaty Application No. PCT/EP2014/070297, dated May 29, 2015, 14 pages.

ZTE: "Data flow for D2D intra-cell and inter-cell discovery", 3GPP Draft; R2-141673—Data Flow for D2D Intra-Cell and Inter-Cell Discovery, 3rd Generation Partnership Project (3GPP), Mobile Competence Centre ; 650, Route Des Lucioles ; F-06921 Sophia-Antipolis vol. RAN WG2, No. Valencia, Spain; Mar. 31, 2014-Apr. 4, 2014 Mar. 22, 2014 (Mar. 22, 2014), XP050792807.

3rd Generation Partnership Project; Technical Specification Group Radio Access Network; Study on LTE Device to Device Proximity Services; Radio Aspects (Release 12), 3GPP Standard; 3GPP TR 36.843, 3rd Generation Partnership Project (3GPP), Mobile Competence Centre ; 650, Route Des Lucioles ; F-06921 Sophia-Antipolis Cedex ; France, vol. RAN WG1, No. V12.0.1, Mar. 27, 2014 (Mar. 27, 2014), pp. 1-XP050770026.

Office action received for corresponding European Patent Application No. 14776623.2, dated Jan. 19, 2018, 7 pages.

* cited by examiner

DEVICE DISCOVERY IN A DEVICE TO DEVICE COMMUNICATION USING TWO TYPES OF DISCOVERY

RELATED APPLICATION

This application was originally filed as Patent Cooperation Treaty Application No. PCT/EP2014/070297 filed Sep. 24, 2014.

This disclosure relates to communications in a wireless communication system and more particularly to wireless device to device communications.

A communication system can be seen as a facility that enables communications between two or more nodes such as fixed or mobile communication devices, access points such as base stations, servers, machine type devices and so on. A communication system and compatible communicating entities typically operate in accordance with a given standard or specification which sets out what the various entities associated with the system are permitted to do and how that should be achieved. For example, the standards, specifications and related protocols can define the manner how communications between communication devices and the access points shall be arranged, how various aspects of the communications shall be provided and how the equipment shall be configured.

Signals can be carried on wireless carriers. Examples of wireless systems include public land mobile networks (PLMN) such as cellular networks, satellite based communication systems and different wireless local networks, for example wireless local area networks (WLAN). Wireless systems can be divided into coverage areas referred to as cells, and hence the wireless systems are often referred to as cellular systems. A base station can provide one or more cells, there being various different types of base stations and cells. In modern radio communication networks, such as the Long Term Evolution (LTE) or the LTE-Advanced (LTE-A) of the 3rd Generation Partnership Project (3GPP), common base stations (often called as Node B; NB or enhanced Node B; eNB) are used.

A user can access the communication system by means of an appropriate communication device or terminal. Communication apparatus of a user is often referred to as a user equipment (UE). Typically a communication device is used for enabling receiving and transmission of communications such as speech and data. A communication device is typically provided with an appropriate signal receiving and transmitting arrangement for enabling communications with other parties. A communication device, for example user equipment (UE) has conventionally communicated in a cellular system with another communication device via a network node such as a base station. Several base stations may be involved in communications between the communication devices.

A communication device may be enabled to use so called proximity services. In accordance with an example of such services a device is enabled to communicate directly with another communication device. Such operation is often referred to as device-to-device (D2D) communications. D2D communications can be based on resources dedicated by the network for device-to-device (D2D) communications. D2D communications may be used to improve efficiency of the radio access network by offloading at least some of the traffic conventionally processed in the base station(s).

To setup D2D communications D2D capable devices may trigger a so-called D2D discovery process. In D2D discovery a device may advertise its capabilities and/or search for other devices capable of D2D communications. The other devices may use similar or different resources than the device willing to establish D2D communications. For example, the devices may be attached to the same cell or different cells and/or the same or different public land mobile network (PLMN), use the same or different frequencies and so on.

It is noted that this is only one example of use of D2D discovery. In addition to this, D2D discovery can be used to provide e.g. a standalone service. A standalone service is a direct device discovery without set-up of direct communications, e.g. where one device tries to find a device of a friend in proximity based on D2D discovery but no direct communications will be established between discovering and discovered devices.

Determination of available resources for the discovery can be problematic. For example, it has been proposed that neighbouring cell resource pool information is provided in System Information Blocks (SIB) of a serving cell or based on reliance of a UE to read neighbouring cell SIBs to get resource pool information. These, however, can be difficult to implement, and may result unnecessary loading of the system and/or power consumption.

Certain examples of device to device (D2D) discovery with reference to functionalities of LTE-A proximity services (ProSe) and device to device (D2D) discovery in accordance 3GPP standardization, especially in accordance with 3GPP Releases 12/13 and beyond are considered as appropriate examples to illustrate the issues further, in particular because 3GPP standardization has already agreed certain layer 2 (L2) radio aspects of the proximity service. It is however noted that this is only a non-limiting example and that similar issues may arise in other services and standards. In 3GPP Release 12 certain agreed aspects of ProSe D2D discovery focus on use cases when in network coverage where inter-cell, inter-frequency and inter public land mobile network (PLMN) discovery support is to be provided. According to these both synchronized and asynchronous deployment scenarios are supported for at least inter-cell discovery. A resource allocation strategy for overlapping discovery resources between cells and non-overlapping discovery resources between cells should also be supported. However, one solution might not be optimal for all different deployment scenarios and resource allocation strategies.

In addition, when inter-frequency and inter-PLMN operations need to be supported for proximity services, discovering or monitoring device needs to be able to discover other devices in different carrier or different PLMN network. To achieve this, an eNB may provide in SIB a list of carriers, possibly with the corresponding PLMN ID, on which the monitoring/discovering device may aim to receive ProSe discovery signals. The carries can be e.g. intra-PLMN-inter-frequency and/or inter-PLMN-inter-frequency carriers. Currently, however, a cell does not support sending of detailed ProSe configuration including resource pools in SIB for other carriers. If a monitoring device wants to receive ProSe discovery signals on another carrier, it needs to read SIB from the other carrier to get detailed resource pools information.

In order to discover other ProSe enabled devices in proximity, a discovering device would need to know the resource pools used by other devices for discovery information announcement. In a network coverage scenario the resource pools information can be provided with common control signalling, e.g. SIB or dedicated control signalling. To support inter-cell/frequency/PLMN discovery, discovering devices need to know the resource pools of the neighbouring cells in same or different frequency carrier or same or different operator network as well. A communication device can get the resource pools information of the neighbouring cells from the serving cell of the device that can provide the resource pools information of the neighbouring cells with common or dedicated control signalling. Another option is to read SIBs of the neighbouring cells by the device to get the resource pools information.

There are certain disadvantages associated with these options, however. For the first option with common signalling via SIB, putting resource pools information of neighbouring cells in a SIB of a serving cell can result a too large SIB. This can be so especially since both time and frequency domain information of the resource pool as well as necessary synchronization information in case of asynchronous deployment should be included for each neighbouring cell pool. Furthermore, a cell may have a substantial number of neighbouring cells. This may be the case especially in the future network since increased use of dense and heterogeneous network (HetNet) deployments is anticipated. Further, with dedicated signalling D2D discovery is only possible for RRC_Connected (radio resource control connected) mode UEs. This is not in line with the aim of supporting D2D discovery for both RRC_Connected mode UEs and RRC_Idle mode UEs.

For the second option, inter-cell/frequency/PLMN discovery is only possible if a discovering device is able to read the SIB of the neighbouring cell which may limit the range of inter-cell discovery support. For example, a discovering device can only read SIB of the intra-frequency neighbouring cells at the cell edge of the serving cell. In addition, a discovering device requires gaps in hundreds of milliseconds for reliable reception of SIB from neighbouring cells and is not able to receive/transmit data in serving cell during these gaps. Such gaps may not be preferable e.g. when a device has ongoing real-time service(s) such as voice over Internet protocol (VoIP) services.

Overall, flexibility in controlling support of inter-cell/PLMN/frequency D2D discovery would be desired.

It is noted that the above discussed issues are not limited to any particular communication environment and station apparatus but may occur in any appropriate system.

Embodiments of the invention aim to address one or several of the above issues.

In accordance with an embodiment there is provided a method for device discovery, comprising determining a type of device discovery to be used by a device for proximity services involving at least one another device, wherein the available types of discovery comprise at least a first type discovery where additional resource information is provided for the device and a second type discovery where no additional resource information is provided, and signalling information based on the determined type of device discovery.

In accordance with an embodiment there is provided an apparatus for a communication device, the apparatus comprising at least one processor, and at least one memory including computer program code, wherein the at least one memory and the computer program code are configured, with the at least one processor, to cause the apparatus to determine a type of device discovery to be used by the communication device for proximity services involving at least one another device, wherein the available types of resource discovery comprise at least a first type discovery where additional resource information is provided for the device and a second type discovery where no additional resource information is provided, and signal information based on the determined type of device discovery.

In accordance with a more specific aspect information of the determined type of device discovery is signalled between an access stratum layer function and an upper layer function. The upper layer function may comprise a non-access stratum layer function. It may be determined on the access stratum layer whether use of the first type of device discovery would be beneficial. This may be subsequent receiving at the access stratum layer function information of determination of the first type by the upper layer function. An indication of the result of the determination may be signalled to the upper layer function. The determining of the type of device discovery may be provided solely, or at least in part on the upper layer. At least a part of the determination may also be provided by an access stratum layer function. The access stratum layer function may base its determinations on at least one measurement.

The determining of the type of the device discovery can be based on at least one of a proximity service application, a user input, at least one measurement, information of battery status of the device and information of activity state of the device. The at least one measurement may comprise measurement of at least one of downlink signal strength of a serving cell and/or neighbouring cells, the neighbouring cell list and cell size.

The first type of device discovery may comprise at least one of an inter-cell discovery, inter-network discovery and inter-frequency discovery. The second type of device discovery may comprise at least intra-frequency discovery and intra-cell discovery.

The device can be configured to request for support from an access system for the device discovery in response to determination of the first type of discovery. Information of resources can be communicated to the device on dedicated signalling in response to determination of the first type of discovery. The device may be entered and/or maintained in connected mode subsequent to requesting for support for the first type of discovery.

Information may be signalled to and/or from a network entity on the upper layer in association with the determination of the type of device discovery. Signalling of information associated with the determination may also take place between different protocol layers within the device.

A computer program comprising program code means adapted to perform the herein described methods may also be provided. In accordance with further embodiments apparatus and/or computer program product that can be embodied on a computer readable medium for providing at least one of the above methods is provided.

A communications device adapted for the operation can also be provided. A network node such as a controller for a base station or a controller for core network may be configured to operate in accordance with at least some of the embodiments. A communication system embodying the apparatus and principles of the invention may also be provided.

It should be appreciated that any feature of any aspect may be combined with any other feature of any other aspect.

Embodiments will now be described in further detail, by way of example only, with reference to the following examples and accompanying drawings, in which.

In the following certain exemplifying embodiments are explained with reference to mobile communication devices of a wireless cellular system and mobile communication systems serving mobile communication devices. Before explaining in detail the exemplifying embodiments, certain general principles of a wireless communication system, access systems thereof, and mobile communication devices are briefly explained with reference to FIGS. 1 to 3 to assist in understanding the technology underlying the described examples. A non-limiting example of the recent developments in communication system architectures is the long-term evolution (LTE) of the Universal Mobile Telecommunications System (UMTS) that is being standardized by the 3rd Generation Partnership Project (3GPP). The LTE employs a mobile architecture known as the Evolved Universal Terrestrial Radio Access Network (E-UTRAN). Base stations of such systems are known as evolved or enhanced Node Bs (eNodeBs; eNBs) and may provide E-UTRAN features such as user plane Radio Link Control/Medium Access Control/Physical layer protocol (RLC/MAC/PHY) and control plane Radio Resource Control (RRC) protocol terminations towards communication devices. Other examples of radio access system include those provided by base stations of systems that are based on technologies such as wireless local area network (WLAN) and/or WiMax (Worldwide Interoperability for Microwave Access).

Figure 1:
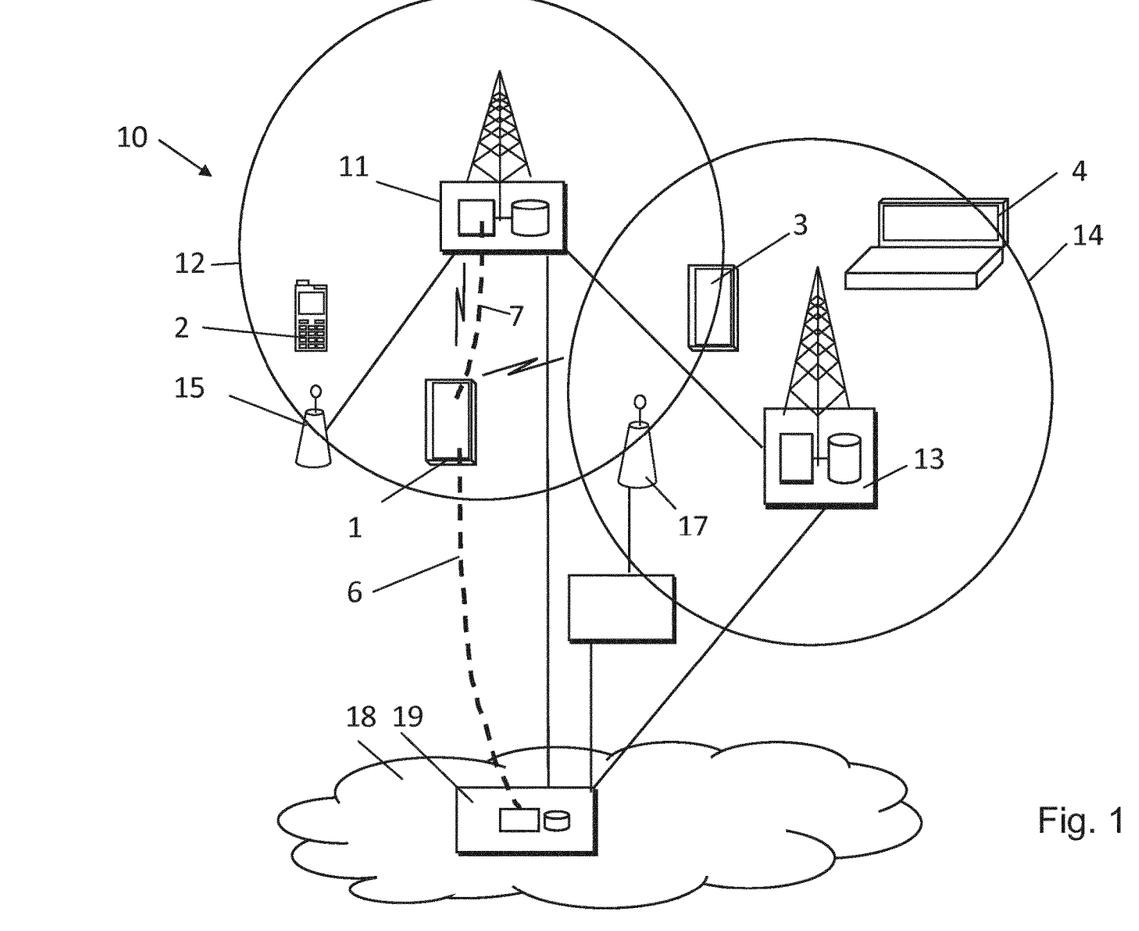
FIG. 1 shows a schematic diagram of a cellular system where certain embodiments can be implemented.

A number of communication devices 1 to 4 are shown. Communication devices or terminals 1 to 4 can be provided wireless access via base stations or similar wireless transmitter and/or receiver nodes providing radio service areas or cells of a radio access system. FIG. 1 shows four base stations 11, 13, 15 and 17, but it is noted that these are shown only for illustration purposes and that a larger or smaller number of base stations sites may be provided in a radio access system. Access networks of the radio access system are connected to a core network denoted by numeral 18.

A base station site can provide one or more cells or sectors. In FIG. 1 two omnidirectional cells 12 and 14 provided by base station 11 and 13, respectively, are shown as schematic examples. It shall be appreciated that the number, size and shape of cells may vary considerably. Also, a radio access system can comprise a number of radio access networks.

Base stations and hence communications in cells are typically controlled by at least one appropriate controller apparatus so as to enable operation thereof and management of mobile communication devices in communication with the base stations. The control apparatus can be interconnected with other control entities. The control apparatus can typically be provided with memory capacity and at least one data processor. The control apparatus and functions may be distributed between a plurality of control units. In some embodiments, each base station can comprise a control apparatus. In alternative embodiments, two or more base stations may share a control apparatus. For example, in LTE a given eNB can control several cells.

Different types of possible cells include those known as macro cells, pico cells and femto cells. For example, transmission/reception points or base stations can comprise wide area network nodes such as a macro eNode B (eNB) which may, for example, provide coverage for an entire cell or similar radio service area. Base station can also be provided by small or local radio service area network nodes, for example Home eNBs (HeNB), pico eNodeBs (pico-eNB), or femto nodes. Some applications utilise radio remote heads (RRH; denoted by 15 in the example) that are connected to for example an eNB (denoted by 11 in the example).

Base stations and associated controllers may communicate with each other via fixed line connection and/or air interface. The logical connection between the base station nodes can be provided for example by an X2 interface.

Figure 2:
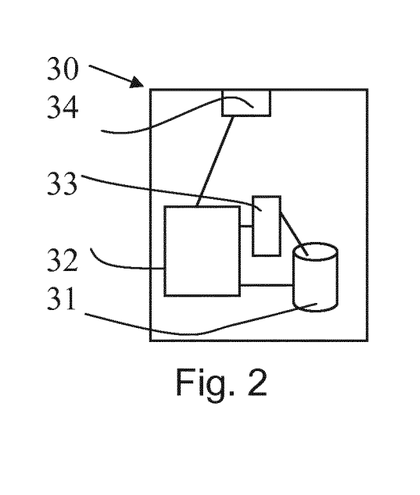
FIG. 2 shows a schematic diagram of a control apparatus according to some embodiments.

FIG. 2 shows an example of a control apparatus for a node, for example to be integrated with, coupled to and/or otherwise for controlling any of the base stations. The control apparatus 30 can be arranged to provide control on communications in the service area of a base station site. The control apparatus 30 can be configured to provide control functions in association with allocation of scheduled transmissions. The control apparatus can also be configured for operation in association with device to device (D2D) communications even if the actual communications do not go via the relevant base station(s). For this purpose the control apparatus comprises at least one memory 31, at least one data processing unit 32, 33 and an input/output interface 34. Via the interface the control apparatus can be coupled to at least one receiver and at least one transmitter of the base station. The control apparatus can be configured to execute an appropriate software code to provide the control functions. It shall be appreciated that similar components can be provided in a control apparatus provided elsewhere in the system, for example in core network entity 19 of FIG. 1.

The communication devices 1 to 4 may comprise any suitable device capable of at least receiving wireless communication of data. For example, the terminals can be handheld data processing devices equipped with radio receiver, data processing and user interface apparatus. Non-limiting examples include a mobile station (MS) such as a mobile phone or what is known as a 'smart phone', a portable computer such as a laptop or a tablet computer provided with a wireless interface card or other wireless interface facility, personal data assistant (PDA) provided with wireless communication capabilities, or any combinations of these or the like. Further examples include wearable wireless devices such as those integrated with watches or smart watches, eyewear, helmets, hats, clothing, ear pieces with wireless connectivity, jewellery and so on, universal serial bus (USB) sticks with wireless capabilities, modem data cards or any combinations of these or the like. Communication devices of users are often referred to as user equipment (UE).

Figure 3:
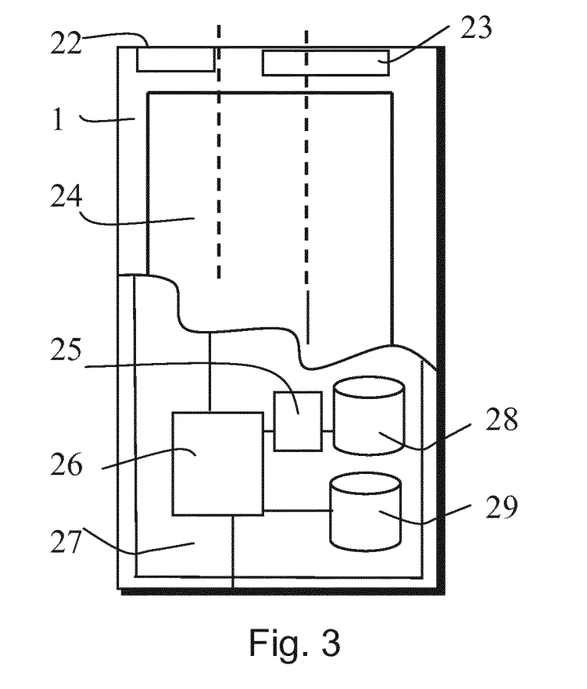
FIG. 3 shows a schematic presentation of a possible communication device.

FIG. 3 shows a schematic, partially sectioned view of a possible communication device. More particularly, a handheld or otherwise mobile communication device 1 is shown. A mobile communication device is provided with wireless communication capabilities and appropriate electronic control apparatus for enabling operation thereof in accordance with the herein described principles. Thus the mobile device 1 is shown being provided with at least one data processing entity 26, for example a central processing unit and/or a core processor, at least one memory 28 and other possible components such as additional processors 25 and memories 29 for use in software and hardware aided execution of tasks it is designed to perform. The data processing, storage and other relevant control apparatus can be provided on an appropriate circuit board 27 and/or in chipsets. Data processing and memory functions provided by the control apparatus of the mobile device are configured to cause control and signalling operations in accordance with certain embodiments of the present invention as described later in this description. A user may control the operation of the mobile device by means of a suitable user interface such as touch sensitive display screen or pad 24 and/or a key pad, one of more actuator buttons 22, voice commands, combinations of these or the like. A speaker and a microphone are also typically provided. Furthermore, a mobile communication device may comprise appropriate connectors (either wired or wireless) to other devices and/or for connecting external accessories, for example hands-free equipment, thereto.

The mobile device may communicate wirelessly with other devices via appropriate apparatus for receiving and transmitting signals. FIG. 3 shows schematically a radio block 23 connected to the control apparatus of the device. The radio block can comprise a radio part and associated antenna arrangement. The antenna arrangement may be arranged internally or externally to the mobile device.

In the following a detailed explanation of discovery by device 1 of other devices, e.g. device 3 and/or 4 for D2D communications is given. In particular, the examples below relate to possibility of selectively supporting D2D discovery and communications by the communication system infrastructure.

Support of inter-cell, inter-frequency and/or inter-PLMN discovery for D2D communications can be desired for some applications, use cases and/or end users. On the other hand, the inventors have recognised that such support may not always be essential, or of any importance for some other applications, use cases and/or end users. Therefore a flexible control of D2D inter-cell, inter-frequency and//or inter PLMN discovery is provided based on application or end user configuration and awareness of D2D discovery features. The control can be provided to selectively apply a different type of discovery operation based on the particular circumstances.

Figure 4:
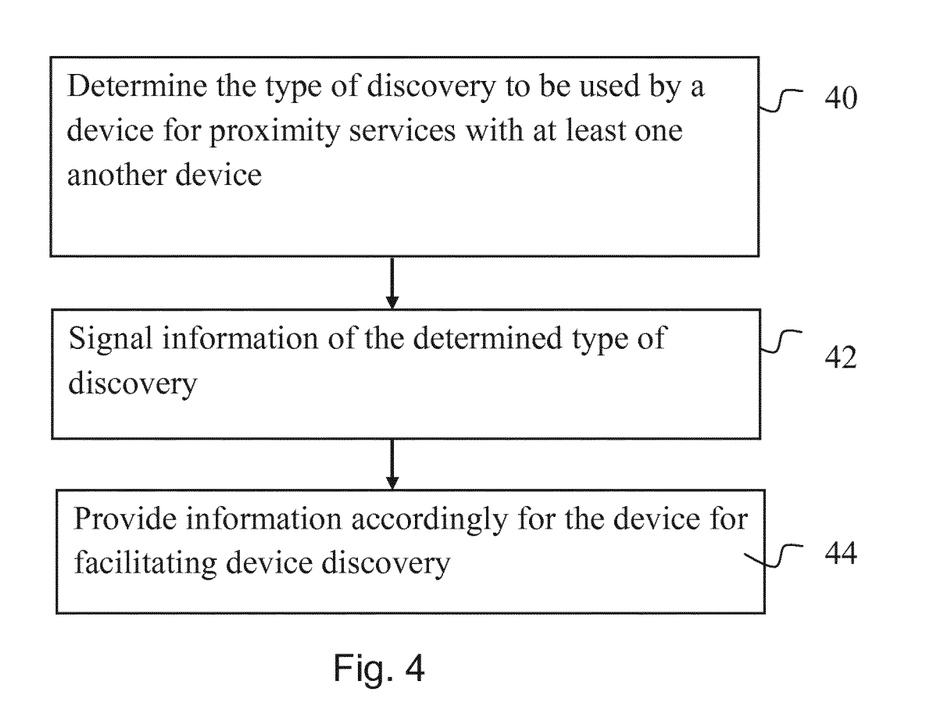
FIG. 4 is a flowchart according to certain embodiments.

FIG. 4 shows a flowchart for operation where an appropriate type of discovery support can be provided. In a method for device discovery the type of device discovery to be used by a device for proximity services involving at least one another device is determined at 40. The types of device discovery can comprise at least a first type discovery where additional discovery resource information is provided for the device and a second type discovery where additional discovery resource information is not necessary.

The determination can be provided at a communication device. For example, a communication device can determine if inter-cell discovery is appropriate or if use thereof should be avoided. The determination can be based at least partially on appropriate measurements indicative of the likelihood of successfully obtaining proximity services, for example D2D communications and/or user input. A determining may also take place in a network entity, either solely or in addition to the determination by the communication device. For example, an access network controller and/or a core network control entity can determine an appropriate discovery type to support.

Information of the determined type of resource discovery can then be signalled at 42 to an appropriate entity adapted to make use of the information. Illustrative examples of this will be given below. Once the determination has been made, resource information is signalled to, obtained by or otherwise provided accordingly at 44 to for the communication device that can make use thereof to facilitate discovery of at least one other device. Illustrative examples of this will also be given below.

In accordance with a possible implementation cross-layer interaction between a lower and higher layer signalling mechanisms in a communication device is provided to determine the type of discovery. The lower level signalling mechanism is then used to provide a flexible management of the discovery types.

In accordance with a possibility, information of resource pools of neighbouring cells can be provided for a communication device via dedicated control signalling to support inter-cell, inter-frequency and/or inter-PLMN discovery. This can be based on application or end user configuration and awareness at a D2D discovery monitoring device.

According to a possibility this is provided by means of a cross-layer interaction between protocol stacks and signalling mechanism for flexible control of D2D discovery. For example, a non-access stratum (NAS) triggered access stratum (AS) signalling procedure can be initiated by a device willing to establish D2D communications. The access stratum (AS) refers to a functional layer in wireless telecom protocol stacks between a radio network and user equipment. This functional layer and logical communications enabled by it between the communication device 1 and base station apparatus 11 is illustrated by the dashed line 7 in FIG. 1. Non-access stratum (NAS) functional layer between the communication device 1 and a core network entity 19 in turn is illustrated by the dashed line 6. The distinction between AS and NAS is that the Access Stratum layer is for communications explicitly between the communication device 1 and the radio network whereas the NAS layer is for communications between the communication device and core network nodes. Thus, while the definition of the access stratum can be different in different standards, in general the access stratum can be defined as being responsible for transporting data over wireless connections and managing use of radio resources. Non-access stratum (NAS) in turn is a functional layer of wireless protocol stacks between the core network and user equipment. NAS layer is typically used to manage the establishment of communication sessions and for maintaining continuous communications with mobile user equipment. A NAS can provide a protocol for messages passed between the user equipment and core network nodes (e.g. Mobile Switching Center; MSC, Serving general packet radio system (GPRS) Support Node; SGSN, or Mobility Management Entity; MNE) that are transparent for the radio network.

In accordance with one specific embodiment an access stratum (AS) control layer entity (e.g. RRC; radio resource control entity) may interact with NAS proximity service (ProSe) application layer entity for flexible control of inter-cell, inter-PLMN and/or inter-frequency D2D discovery at a monitoring device. This can be provided as an internal cross-layer interaction in a device. A communication device wanting to use a proximity service can be configured to provide the physical entity where the interaction can take place.

Figure 5:
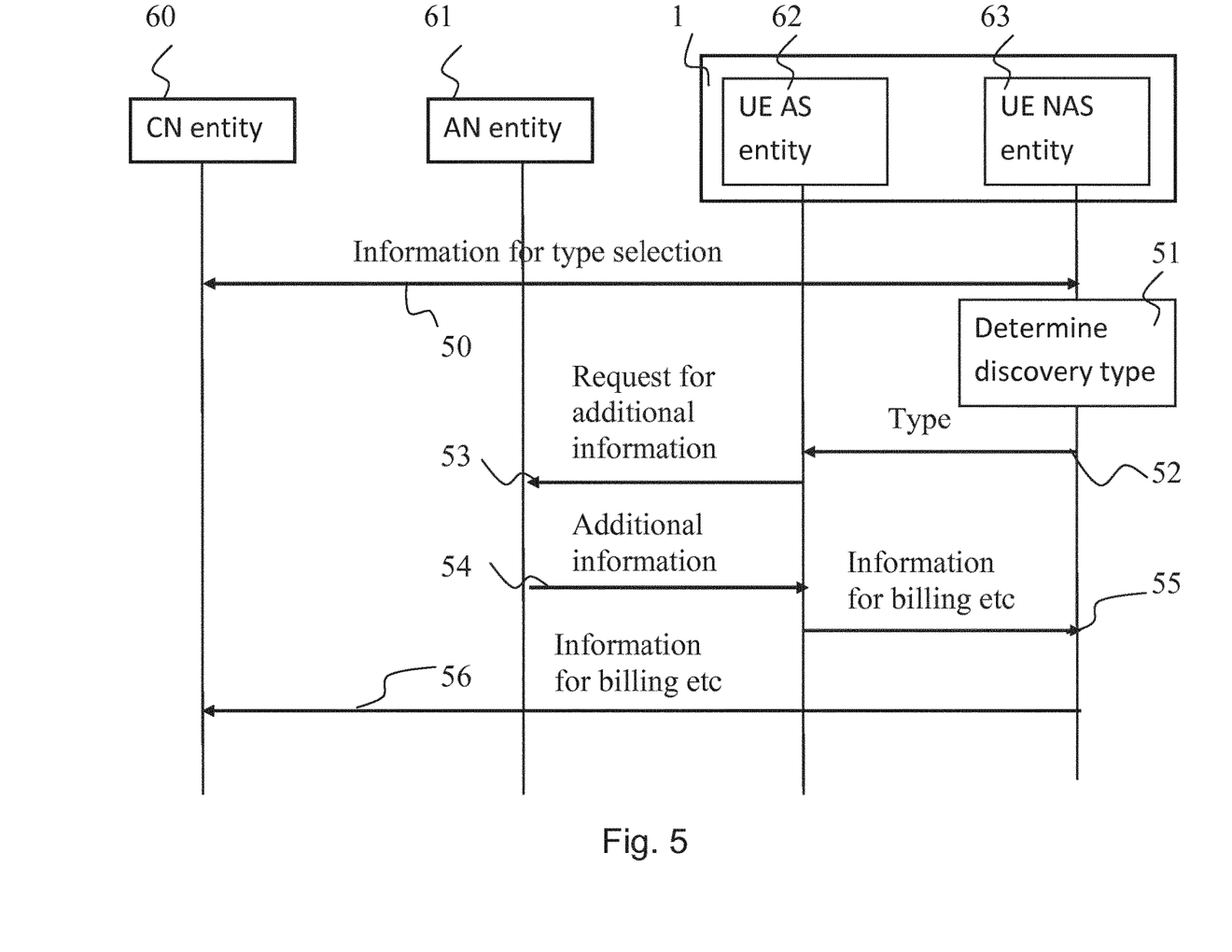
FIG. 5 is a signalling flow chart illustrating certain examples.

FIG. 5 shows a signalling flow chart in accordance with an example, A NAS layer functionality in a device such as a user equipment (UE) may be arranged to interact with AS layer in the UE for the flexible control of D2D discovery. The NAS layer functionality in the UE may determine at 51 the discovery type. For example, in a ProSe application layer of the NAS layer two types of D2D discovery procedures may be introduced. More particularly, full range (FR) D2D discovery and limited range (LR) D2D discovery may be provided. Determining of the discovery type at 51 may be based on some signalling with the core network (CN) entity on NAS level, denoted by signalling 50. In accordance with a scenario the NAS level signalling at this stage is used to authenticate the right of the device for a FR discovery.

The NAS layer signalling may then confirm (enable/disable) use of FR or LR. The NAS functional entity may inform by message 52 the AS entity in the UE which discovery type it determined as appropriate. The AS entity in the UE may then use AS signalling to request by signalling 53 an access network (AN) entity, for example an eNB, to provide additional resource related information. Additional information such as information on the neighbouring resource pools is then returned via signal 54.

Based on the ProSe application or the end user configuration of FR or LR discovery AS layer may be configured to enable or disable, as the case may be, inter-cell, inter-frequency, and/or inter-PLMN D2D discovery.

For example, if FR discovery is configured in ProSe application by application default configuration or end user, NAS layer may indicate by message 52 the FR discovery configuration to the AS layer to enable inter-cell/frequency/PLMN discovery at a monitoring UE. This can thus be an internal interaction between NAS and AS layers of the UE. This indication may be given once for the active duration of such ProSe application.

After receiving the indication, the AS layer entity of the monitoring device may request accordingly for inter-cell, inter-frequency and/or inter-PLMN D2D discovery support with a specific signalling procedure. In FIG. 5 this would be provided by the AS layer signalling 53.

If LR discovery is determined instead of FR discovery as being configured, the monitoring device does not necessarily need to request any further information but can use resource pool information of the serving cell for D2D discovery without any additional effort for getting more resource pool information for neighbouring cells. That would mean no support of inter-cell/inter-PLMN/inter-frequency D2D discovery is provided by the access system. However, in the circumstances this may be considered as an optimal solution for the discovery.

In accordance with a possibility the AS layer entity can be configured to indicate to the NAS layer entity when inter-cell D2D discovery (FR discovery) may actually take place. In FIG. 5 this would occur before determination of the discovery type. For example, the AS layer may provide information that a certain type of discovery can be beneficial for the end user and/or the proximity service application and therefore should be used. The indication can be based on appropriate radio measurements such as received downlink (DL) signal strength of the serving cell and/or neighbouring cells and/or neighbouring cell list and/or cell size. For example, a device wanting to use proximity services can measure received downlink signal strength of a serving cell and/or a neighbouring cell or cells. If the device determines the serving cell signal strength to be lower than a certain threshold and/or if a neighbouring cell signal strength is higher than a certain threshold or the neighbouring to serving cell signal strength ratio is higher than a certain threshold, the AS can indicate for the NAS layer that an appropriate type can be determined if FR can be supported. This determination and indication can take place internally within the device.

The indication may trigger NAS level signalling to authenticate a right for a FR discovery if this has not been done before in signal 50. The NAS may then confirm (enable/disable) use of FR or LR.

Usage of network resources for FR discovery may be indicated for an appropriate charging system and network allowed to charge the user accordingly based on NAS layer signalling. This is illustrated by signal 56. This signalling may be at least partially be based on information received at 55 from the AS entity. It shall be appreciated that signals 55 and 56 can also be sent at different time, e.g. before or in parallel with signal 53.

In some applications the user may be charged without information from the AS. Information from AS can be advantageous though since it improves the accuracy of the charging operation. For example, after FR is determined to be used by the NAS and this has been indicated to AS the AS may determine that it is not able to properly use the FR, e.g. based on radio measurement related criteria and/or user input. In this case, the FR may not be used by AS even though the NAS had already determined FR type to be used. Instead, the use is triggered only when also the AS detects that FR is of benefit for the D2D discovery service. Thus if the corresponding billing procedure is initiated only in response to signal 55, the user is not charged for the FR discovery.

According to a possibility the AS layer may be configured to directly decide internally within the device without confirmation from NAS if inter-cell discovery is needed. This can be done e.g. based on appropriate radio measurements. For example AS layer in a communication device can determine based on radio measurements and FR or LR configuration information from the NAS layer of the UE when to start FR or LR discovery and/or which type of discovery shall be used. The criteria can be based e.g. on thresholds as described above.

The AS layer can be provided with a new signalling capability to allow UEs to request inter-cell, inter-frequency and/or inter-PLMN D2D discovery support. For example, if FR discovery is configured, AS layer entity of a monitoring UE may send the inter-cell, inter-frequency and/or inter-PLMN discovery support request to an eNB. This can be communicated by means of e.g. RRC signalling or Layer 1/Layer 2 (L1/L2) signalling. Based on the request, the eNB may provide D2D discovery resource pools information of the neighbouring cells with dedicated RRC signalling.

To request and receive inter-cell, inter-frequency and/or inter-PLMN D2D discovery support based on dedicated signalling, the requesting UE needs to be in RRC_Connected mode. The UE may need to be moved to the connected mode if it is not there already in response to determination of a discovery type requiring support from the network. Even after receiving the resource pool information of neighbouring cells, the requesting UE may need to be kept in RRC_Connected mode in order to get updates of resource pools information. Therefore, the UE configuration on e.g. discontinuous reception (DRX) and RRC state related timers may be set differently to keep the UE in RRC_Connected mode even if only for the purposes of D2D discovery control. Otherwise, a UE may be kept in RRC_Idle state without support of inter-cell/frequency/PLMN discovery, which corresponds to LR D2D discovery in ProSe application layer.

In the above various measurements, a proximity service application and a user input were given as possible basis of determining/enabling a type of the resource discovery. The determination by a NAS and/or AS layer function may also be based on other information. For example, information of battery status of the device and/or information of activity state of the device may be taken into account. For example, NAS determination on the discovery type may also be based on UE battery status e.g. such that low battery enables triggering of the LR only. Ongoing use of services may be taken into account e.g. such that when a UE has active ongoing multiple services or real-time emergency services or other services it may not be configured with the FR type.

The above described embodiments can provide flexible control on support of inter-cell/PLMN/frequency D2D discovery where dedicated signalling is used for providing resource pools information of neighbouring cells. The need of providing neighbouring cell resource pools information in SIBs of a serving cell and/or reliance on a UE to read neighbouring cell SIBs to get resource pools information can be avoided.

Different discovery types, for example the full range (FR) discovery and limited range (LR) discovery explained above, can be used selectively. This can be advantageous e.g. to avoid unnecessary battery consumption and/or charging that may be associated with FR discovery. Access stratum layer functions can be configured to optimize use of resources such as battery consumption in determining whether to operate FR. If FR is configured, AS would typically not be able to control those aspects of FR that may force UE into RRC_Connected mode and/or charging of FR discovery. Entering this mode unnecessarily can be prevented based on the herein described mechanism.

Support of intra-frequency inter-cell discovery, inter-frequency discovery and inter-PLMN discovery may be configured commonly and mapped to FR discovery functions. It is also possible to provide multiple types of FR discovery procedures such that each type corresponds to one of inter-cell, inter-frequency and inter-PLMN discovery so that they can be configured separately. Accordingly, the AS layer signalling between UE and network may be configured commonly or separately for each type of FR discovery.

It is noted that whilst embodiments have been described in relation to LTE-A, similar principles can be applied to any other communication system where scheduled resources are allocated for transmissions or indeed to further developments with LTE-A. Further, the examples above are given in relation to D2D discovery for enabling D2D communications but this is not the only possible use of D2D discovery. Other examples include standalone proximity services such as discovering proximity of a friend or a place of interest (e.g. a restaurant shop, a landmark etc.) and so. Further examples are available e.g. from 3GPP TS 22.803 "Feasibility study for Proximity Services (ProSe)" version 12.2.0 in section 5 under heading "Use Cases and Scenarios". Therefore, although certain embodiments were described above by way of example with reference to certain exemplifying architectures for wireless networks, technologies and standards, embodiments may be applied to any other suitable forms of communication systems than those illustrated and described herein.

The required data processing apparatus and functions of a base station apparatus, a communication device, a core network element and any other appropriate apparatus may be provided by means of one or more data processors. The described functions at each end may be provided by separate processors or by an integrated processor. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non-limiting examples. The data processing may be distributed across several data processing modules. A data processor may be provided by means of, for example, at least one chip. Appropriate memory capacity can also be provided in the relevant devices. The memory or memories may be of any type suitable to the local technical environment and may be implemented using any suitable data storage technology, such as semiconductor based memory devices, magnetic memory devices and systems, optical memory devices and systems, fixed memory and removable memory.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof. The software may be stored on such physical media as memory chips, or memory blocks implemented within the processor, magnetic media such as hard disk or floppy disks, and optical media such as for example DVD and the data variants thereof, CD.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the spirit and scope of this invention as defined in the appended claims. Indeed there is a further embodiment comprising a combination of one or more of any of the other embodiments previously discussed.

The invention claimed is:

1. A method for device discovery, comprising:
   determining, by a communication device configured for access to a communication system, a type of device discovery to be used by the communication device for proximity services involving at least one other device, wherein the available types of device discovery comprise at least a first type of device discovery where additional resource information is received from the communication system for the communication device and a second type of device discovery where no additional resource information is received by the communication device; and
   signalling information based on the determined type of device discovery.

2. A method according to claim 1, comprising signalling information of the determined type of device discovery between an access stratum layer function and an upper layer function of the communication device.

3. A method according to claim 2, wherein the upper layer function comprises a non-access stratum layer function.

4. A method according to claim 2, comprising,
   determining at the access stratum layer function a use or non-use of the first type of device discovery, and
   signalling an indication of the determination of the use or non-use of the first type of device discovery to the upper layer function.

5. A method according to claim 2, wherein the determining of the type of device discovery is provided on the upper layer.

6. A method according to claim 4, comprising receiving at the access stratum layer function information of determination of the first type of device discovery by the upper layer function prior to determining the use or non-use of the first type of device discovery.

7. A method according to claim 1, wherein the determining of the type of the device discovery is based on at least one of a proximity service application, a user input, at least one measurement, information of battery status of the communication device and information of activity state of the communication device.

8. A method according to claim 7, wherein the at least one measurement comprises measurement of at least one of downlink signal strength of a serving cell and/or neighbouring cells, the neighbouring cell list and cell size.

9. A method according to claim 8, wherein the determination of the type of device discovery is provided at least in part by an access stratum layer function based on the at least one measurement.

10. An apparatus for a communication device, the apparatus comprising at least one processor, and at least one memory including computer program code, wherein the at least one memory and the computer program code are configured, with the at least one processor, to cause the apparatus to:
determine, by a communication device configured for access to a communication system, a type of device discovery to be used by the communication device for proximity services involving at least one other device, wherein the available types of device discovery comprise at least a first type of device discovery where additional resource information is received from the communication system for the communication device and a second type of device discovery where no additional resource information is received by the communication device; and
signal information based on the determined type of device discovery.

11. An apparatus according to claim 10, configured to provide an access stratum layer function and an upper layer function of the communication device and to signal information of the determined type of device discovery between the access stratum layer function and the upper layer function of the communication device.

12. An apparatus according to claim 11, configured to determine at the access stratum layer function a use or non-use of the first type of device discovery and signal an indication of the determination of the use or non-use of the first type of device discovery to the upper layer function.

13. An apparatus according to claim 11, configured to determine the type of device discovery to be used on the upper layer and/or the access stratum layer function and signal an indication of the determination between the access stratum layer function and the upper layer function of the communication device.

14. An apparatus according to claim 10, configured to take into account in determining the type of the device discovery information from at least one of a proximity service application, user input, at least one measurement, battery status of the communication device and activity state of the communication device.

15. An apparatus according to claim 10, wherein the first type of device discovery comprises at least one of an inter-cell discovery, inter-network discovery and inter-frequency discovery, and the second type of device discovery comprises at least intra-frequency discovery and intra-cell discovery.

16. An apparatus according to claim 10, configured to cause the communication device to request support from an access system for the device discovery in response to determination of the first type of device discovery and process resource information received via dedicated signalling in response to the request.

17. An apparatus according to claim 16, configured to maintain the communication device in connected mode subsequent to sending the request for support for the first type of device discovery.

18. An apparatus according to claim 10, configured to signal information to and/or from a network entity and between different protocol layers within the device in association with determination of the type of device discovery.

19. A non-transitory computer program product comprising a program code stored in a tangible form in a computer readable medium configured to cause an apparatus at least to: determine, by a communication device configured for access to a communication system, a type of device discovery to be used by the communication device for proximity services involving at least one other device, wherein the available types of device discovery comprise at least a first type of device discovery where additional resource information is received from the communication system for the communication device and a second type of device discovery where no additional resource information is received by the communication device, and signal information based on the determined type of device discovery.

20. The computer program product according to claim 19, the program code further configured to cause the apparatus at least to: signal information of the determined type of device discovery between an access stratum layer function and an upper layer function of the communication device.

* * * * *